(12) United States Patent
Raia et al.

(10) Patent No.: US 11,583,373 B2
(45) Date of Patent: Feb. 21, 2023

(54) COLOURED CURABLE COMPOSITION FOR ADDITIVE MANUFACTURING PROCESSES, 3-DIM COMPOSITE ARTICLE AND USE THEREOF

(71) Applicant: 3M INNOVATIVE PROPERTIES COMPANY, St. Paul, MN (US)

(72) Inventors: Gioacchino Raia, Turkenfeld (DE); Adrian S. Eckert, Herrsching (DE); Malte Korten, Moorenweis (DE); Martin Goetzinger, Moorenweis (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1033 days.

(21) Appl. No.: 16/327,111

(22) PCT Filed: Aug. 14, 2017

(86) PCT No.: PCT/US2017/046690
§ 371 (c)(1),
(2) Date: Feb. 21, 2019

(87) PCT Pub. No.: WO2018/038954
PCT Pub. Date: Mar. 1, 2018

(65) Prior Publication Data
US 2019/0201171 A1    Jul. 4, 2019

(30) Foreign Application Priority Data

Aug. 25, 2016   (EP) .................................... 16185635

(51) Int. Cl.
| | | |
|---|---|---|
| *B29C 35/08* | (2006.01) |
| *C08F 2/46* | (2006.01) |
| *C08F 2/50* | (2006.01) |
| *C08G 61/04* | (2006.01) |
| *A61C 13/00* | (2006.01) |
| *B33Y 70/00* | (2020.01) |
| *B33Y 10/00* | (2015.01) |
| *B29C 64/124* | (2017.01) |
| *C08K 5/00* | (2006.01) |
| *C08K 5/08* | (2006.01) |
| *B22C 9/04* | (2006.01) |
| *B22C 7/02* | (2006.01) |
| *C08K 5/05* | (2006.01) |
| *C08F 222/10* | (2006.01) |
| *C08K 5/3437* | (2006.01) |
| *C08L 35/02* | (2006.01) |
| *A61C 13/20* | (2006.01) |
| *A61C 13/08* | (2006.01) |
| *A61C 7/14* | (2006.01) |
| *C08F 220/28* | (2006.01) |

(Continued)

(52) U.S. Cl.
CPC ............ *A61C 13/0013* (2013.01); *B22C 7/02* (2013.01); *B22C 9/04* (2013.01); *B29C 64/124* (2017.08); *B33Y 10/00* (2014.12); *B33Y 70/00* (2014.12); *C08F 222/1025* (2020.02); *C08F 222/1065* (2020.02); *C08K 5/0041* (2013.01); *C08K 5/05* (2013.01); *C08K 5/08* (2013.01); *C08K 5/3437* (2013.01); *C08L 35/02* (2013.01); *A61C 7/14* (2013.01); *A61C 13/082* (2013.01); *A61C 13/20* (2013.01); *B33Y 70/10* (2020.01); *C08F 220/20* (2013.01); *C08F 220/281* (2020.02); *C08F 222/102* (2020.02); *C08K 2201/014* (2013.01); *Y02P 10/25* (2015.11)

(58) Field of Classification Search
CPC .......... C08F 222/1065; C08F 222/1025; C08F 222/102; C08F 222/281; C08F 222/20; C08L 35/02; B22C 9/04; B22C 7/02; B22C 64/124; B29C 64/124; C08K 5/08; C08K 5/05; C08K 5/0041; C08K 2201/014; A61C 13/0013; A61C 13/20; A61C 13/082; A61C 7/14; B33Y 70/00; B33Y 10/00; Y02P 10/25
USPC ........ 264/401; 522/189, 184, 71, 1, 6; 520/1
See application file for complete search history.

(56) References Cited

U.S. PATENT DOCUMENTS

| 4,071,124 A | 1/1978 | Price |
| 4,737,593 A | 4/1988 | Ellrich |
| 10,010,488 B2 | 7/2018 | Eckert |

(Continued)

FOREIGN PATENT DOCUMENTS

| CN | 102366818 | 3/2012 |
| EP | 2431157 | 3/2012 |

(Continued)

OTHER PUBLICATIONS

Schwebende Fische und kreiselnde Schildkröten, dated Oct. 2, 2016; retrived from online on Apr. 11, 2019, [https://www.pro-physik.de/nachrichten/schwebende-fische-und-kreiselnde-Schildkroeten.html], 4 pages.

(Continued)

*Primary Examiner* — Jessica Whiteley (57) ABSTRACT

The invention relates to a coloured curable composition for use in an additive manufacturing process, the composition comprising a curable resin composition comprising radiation curable components, a photo initiator, a dye composition comprising a dye D1 and a dye D2, dye D1 having a light absorption maximum within a wave length range from 400 to 530 nm, dye D2 showing a light absorption maximum within a wave length range from 540 to 650 nm. The invention also relates to a 3-dim composite article obtained by processing the curable composition in an additive manufacturing process.

16 Claims, 2 Drawing Sheets

(51) Int. Cl.
    *B33Y 70/10*     (2020.01)
    *C08F 220/20*    (2006.01)

(56)             References Cited

U.S. PATENT DOCUMENTS

2002/0008333 A1    1/2002  Napadensky
2008/0287564 A1*  11/2008  Klare .................. C08L 75/16
                                                           522/96
2014/0072712 A1*   3/2014  Xu ..................... A61C 11/00
                                                           522/18
2017/0183519 A1    6/2017  Morita

FOREIGN PATENT DOCUMENTS

WO    WO 2001-012679      2/2001
WO    WO 2007-048819      5/2007
WO    WO 2009-151957     12/2009
WO    WO 2013-153183     10/2013
WO    WO 2014-078537      5/2014

OTHER PUBLICATIONS

International Search report for PCT International application No. PCT/US2017/046690 dated Sep. 28, 2017, 5 pages.

\* cited by examiner

COLOURED CURABLE COMPOSITION FOR ADDITIVE MANUFACTURING PROCESSES, 3-DIM COMPOSITE ARTICLE AND USE THEREOF

FIELD OF THE INVENTION

The invention relates to a coloured curable composition for use in an additive manufacturing process. The curable composition comprises at least 2 dyes, wherein one dye has a light absorption maximum within a wave length range from 400 to 530 nm and the other dye has a light absorption maximum within a wave length range from 540 to 650 nm. The curable composition facilitates the production of 3-dim article with high accuracy. Once processed, the cured composition has an essentially deep coloured, nearly black appearance.

BACKGROUND

Additive manufacturing processes are becoming increasingly popular for producing 3-dim articles in various areas of technology, including the dental and orthodontic area.

The curable compositions used for producing the 3-dim articles typically contain a curable resin, a photo initiator, a high boiling additive and a dye.

WO 2014/078537 A1 (Sun et al.) describes a three-dimensional fabrication material system for producing dental products. The composition for making a three-dimensional dental prosthesis comprises a mixture of (meth)acrylate, an inorganic filler, an organic filler, a silicone-acrylic-based rubber impact modifier, pigments and light initiators.

WO 2013/153183 A2 (Wachter et al.) describes a composite resin composition and method for producing dental components by means of stereo-lithography. The composite resin composition contains a) at least one poly-reactive binder, b) a first photo-polymerization initiator with an absorption maximum at a wavelength of less than 400 nm, c) a second photo polymerization initiator with an absorption maximum of at least 400 nm, and d) an absorber with an absorption maximum at a wavelength of less than 400 nm for the SLA production of a dental formed component on the basis of a composite resin.

US 2008/0287564 A1 (Klare et al.) describes a biocompatible, low-viscosity radiation-curable formulation for producing medical products, in particular adaptive ear pieces, otoplastic parts, shells or ear parts, by means of PNP methods or stereolithographic methods, wherein the critical energy to penetration depth is adjusted by adding small quantities of anaerobic inhibitors such as phenothiazine or DPPH.

US 2014/0072712 A1 (Xu) describes opaque inks for use with a three dimensional printing system comprising 10-95 wt. % polymerizable component and 3-25 wt. % non-reactive wax component.

However, none of the curable compositions described in the prior art is completely satisfying.

There is still a need for an improved curable composition, which can be used for producing 3-dim articles by additive manufacturing technology.

DESCRIPTION OF THE INVENTION

The following issues are often observed when producing 3-dim articles by additive manufacturing techniques:

Once the 3-dim article has been produced by an additive manufacturing technology, the 3-dim article has to be removed from the building platform.

Especially, if small parts are concerned, it is often difficult to distinguish between structures relating to the desired 3-dim article and structures created and needed to support the desired 3-dim article during the build-up process. The material the desired 3-dim article and the support structures are made of is identical.

Another issue relates to the orientation of the 3-dim article on the building platform during the manufacturing process. To obtain an accurate result, the 3-dim article typically has to have a certain orientation on the building platform.

Thus, it is an object of the invention to provide a curable composition which can be processed by additive manufacturing processes to produce a 3-dim article having high surface resolution.

Further, the 3-dim article should have sufficient strength after having been processed in an additive manufacturing process.

It is another object of the invention to provide a curable composition which can be processed by additive manufacturing processes to produce a 3-dim article, which can easily be detached or separated from any support or substructure created during the additive manufacturing process.

It would also be desirable, if the produced 3-dim article can easily be inspected for accuracy, even in small dimensions and allows an easy modification of the shape and/or surface, if desired.

Ideally, it would be desirable if the curable composition can be incinerated without leaving residues.

It is also desirable, if there is a high degree of freedom as regards the orientation of the 3-dim article during the additive manufacturing process.

At least one of the above objects can be achieved by the curable composition described in the present text and the claims.

In one embodiment the present invention features a composition comprising a coloured curable composition for use in an additive manufacturing process, the composition comprising
- a curable resin composition comprising radiation curable components,
- a photo initiator,
- a dye composition comprising a dye D1 and a dye D2,
- dye D1 having a light absorption maximum within a wave length range from 400 to 530 nm;
- dye D2 showing a light absorption maximum within a wave length range from 540 to 650 nm.

In another embodiment, the invention relates to a process of producing the curable composition as described in the present text and the claims.

The invention is also related to a kit of parts and a cartridge containing the curable composition described in the present text and the claims.

Moreover, the invention features a process of producing a 3-dim composite article by an additive manufacturing technique as described in the present text.

The invention is also directed to a 3-dim composite article obtained or obtainable according to such a process.

A further aspect of the invention is directed to a process of producing a 3-dim cast article comprising the steps of
- processing the curable composition as described in the present text in an additive manufacturing process to obtain a 3-dim composite article,
- embedding the 3-dim composite article in an investment material, replacing the material of the 3-dim composite article by a casting material to obtain a 3-dim cast article embedded in the investment material, removing the investment material from the 3-dim cast article.

Unless defined differently, for this description the following terms shall have the given meaning:

A "hardenable component or material" or "polymerizable component" is any component which can be cured or solidified in the presence of a photo initiator by radiation-induced polymerization. A hardenable component may contain only one, two, three or more polymerizable groups. Typical examples of polymerizable groups include unsaturated carbon groups, such as a vinyl group being present i.a. in a (methyl)acrylate group.

A "photo initiator" is a substance being able to start or initiate the curing process of a hardenable composition in the presence of radiation, in particular light (wave length from 300 to 700 nm).

A "monomer" is any chemical substance which can be characterized by a chemical formula, bearing polymerizable groups (including (meth)acrylate groups) which can be polymerized to oligomers or polymers thereby increasing the molecular weight. The molecular weight of monomers can usually simply be calculated based on the chemical formula given.

As used herein, "(meth)acryl" is a shorthand term referring to "acryl" and/or "methacryl". For example, a "(meth) acryloxy" group is a shorthand term referring to either an acryloxy group (i. e., $CH_2=CH-C(O)-O-$) and/or a methacryloxy group (i. e., $CH_2=C(CH_3)-C(O)-O-$).

A "curing, hardening or setting reaction" is used interchangeable and refers to a reaction wherein physical properties such as viscosity and hardness of a composition changes over the time due to a chemical reaction between the individual components.

The term "dental or orthodontic article" means any article which is to be used in the dental or orthodontic field, especially for producing a dental restoration, orthodontic devices, a tooth model and parts thereof.

Examples of dental articles include crowns, bridges, inlays, onlays, veneers, facings, copings, crown and bridged framework, implants, abutments, dental milling blocks, monolithic dental restorations and parts thereof.

Examples of orthodontic articles include brackets, buccal tubes, cleats and buttons and parts thereof.

A dental or orthodontic article should not contain components which are detrimental to the patient's health and thus free of hazardous and toxic components being able to migrate out of the dental or orthodontic article.

A "transparent material" lets light pass through according to Snell's law (classical law of refraction). So, a picture can be seen in its details through a platelet of a transparent material.

A "translucent material" lets light partially permeate through although it is not fully transparent, i.e. showing a significant volume scattering of the transmitted light. The reciprocal property of translucency is opacity (O). $O=1/T=I/I0$ (T=Transmission, I=Intensity of permeated light, I=Intensity of light before permeation). So, opacity values less than about 0.9 for a 1 mm thick platelet with a diameter of 15 mm are regarded as translucent (e.g. for a measurement with a Color i7 device, X-Rite corporation USA, measurement mode: remission contrast ratio). Opacity can be measured by various means: in transmission, in remission, and in remission using the contrast ratio method.

"Additive manufacturing" means processes used to make 3-dimensional articles. An example of an additive manufacturing technique is stereolithography (SLA) in which successive layers of material are laid down and radiation cured under computer control. The articles can be of almost any shape or geometry and are produced from a 3-dimensional model or other electronic data source. Other examples of additive manufacturing processes or techniques include 3d-printing.

"Ambient conditions" mean the conditions which the composition described in the present text is usually subjected to during storage and handling. Ambient conditions may, for example, be a pressure of 900 to 1100 mbar, a temperature of 10 to 40° C. and a relative humidity of 10 to 100%. In the laboratory ambient conditions are typically adjusted to 20 to 25° C. and 1000 to 1025 mbar.

A composition is "essentially or substantially free of" a certain component, if the composition does not contain said component as an essential feature. Thus, said component is not wilfully added to the composition either as such or in combination with other components or ingredient of other components. A composition being essentially free of a certain component usually does not contain that component at all. However, sometimes the presence of a small amount of the said component is not avoidable e.g. due to impurities contained in the raw materials used.

As used herein, "a", "an", "the", "at least one" and "one or more" are used interchangeably. The terms "comprises" or "contains" and variations thereof do not have a limiting meaning where these terms appear in the description and claims. Also herein, the recitations of numerical ranges by endpoints include all numbers subsumed within that range (e.g., 1 to 5 includes 1, 1.5, 2, 2.75, 3, 3.80, 4, 5, etc.).

Adding an "(s)" to a term means that the term should include the singular and plural form. E.g. the term "additive(s)" means one additive and more additives (e.g. 2, 3, 4, etc.).

Unless otherwise indicated, all numbers expressing quantities of ingredients, measurement of physical properties such as described below and so forth used in the specification and claims are to be understood as being modified in all instances by the term "about".

The term "comprise" shall include also the terms "consist essentially of" and "consists of".

DETAILED DESCRIPTION OF THE INVENTION

The curable composition described in the present text provides a number of advantageous features.

The curable composition has a specific colouration and is well suited for being processed by an additive manufacturing process like SLA-printing.

It was also found that the curable composition can be processed in an additive manufacturing process applying wave lengths in the range from 365 to 405 nm independent from the devices used for conducting the manufacturing process (e.g. whether it is a digital light processing process ("DLP") or a wiper process, i.e. a process using a scraper).

Thus, the curable composition described in the present text can be processed essentially on any kind of additive manufacturing equipment using light curing.

Due to the absence of inorganic chromatic pigment and/or inorganic fillers in the curable composition, the curable composition and the 3-dim articles produced therefrom are completely combustible. That is, after a burn-out process no residues are left which may negatively influence a later casting process (so-called "lost wax process" or "investment casting process").

Further, due to its particular composition comprising different dyes, the curable composition facilitates the building of precise structures, even if the structures are small (e.g. have a size below 10 mm in each dimension.

The particular composition of different dyes allows to control the penetration of light (in particular UV-light) into the curable and cured composition. By doing the risk of over-curing or curing of non-desired regions of the curable composition can be reduced.

In particular, it has been found, that a deep purple colourized UV light curable (meth)acrylate based resin composition is useful for the production of accurate 3-dim printed articles. In the cured state the printed articles appears to have a black surface.

This is in particular useful if small and filigree structures should be produced. E.g. for the additive manufacturing production of lingual brackets the curable composition has to fulfil special requirements.

As high accuracy is important, the visual inspection of the articles after printing is typically crucial in this process.

One important process step is the manual removal or separation of the support geometry from the desired 3-dim article.

Because of the filigree structures orthodontic bracket typically have, common 3D printing resins for investment casting appear essentially transparent for a small path length (e.g. if thin details are printed).

Thus, in many cases it is hardly possible for the practitioner to differentiate if a support geometry has properly been removed or not or whether there are other artefacts.

This issue is addressed by the curable composition described in the present text. The obtained 3-dim articles are deeply coloured and appear essentially black after printing even in thin layers.

This facilitates the visual inspection of the 3-dim article and removal of support structures and non-desired artefacts.

In addition, remaining printing artefacts or support structure elements can not only be easily visually detected but also easily removed from the 3-dim article, e.g. by shaping, milling, grinding or polishing means. It has been observed that the dust produced by the removal process is brighter than the underneath surface of the 3-dim article. Thus, the practitioner can easily determine on which parts of the surface of the 3-dim article a removal process has been done. It was found that this effect can be enhanced if the particle size of the dust is reduced. This is advantageous also if the shape of the 3-dim article should be adapted for other reasons.

Further, it was found that the curable composition described in the present text provides the practitioner with more freedom how to orient the 3-dim article to be produced on the building platform of an additive manufacturing machine (in particular SLA printer).

It is now possible to arrange the 3-dim articles to be produced in essentially any desired orientation, e.g. vertical or horizontal without negatively affecting the accuracy of the printing results to a non-acceptable extent. This can help to produce more 3-dim articles at the same time as more 3-dim articles can be arranged on the building platform.

Typically, the curable composition described in the present text can be characterized by one or more of the following properties:

viscosity: less than 200 mPa*s at 23° C.;

light absorption in the range from 400 to 650 nm: more than 90% for a path length of 5 mm;

light transmission: less than 25% or less than 20% for a path length of 1 mm (for day light);

colour impression: deeply coloured for a path length of 10 mm or more;

hue h°: below 30 determined for a path length of 5 mm in transmission mode according to the CIELCh colour system pH value: 6-8 if the curable composition is brought in contact with wet pH sensitive paper;

optionally combustible within a temperature range of 600 to 900° C. or 600 to 800° C. without residues.

The viscosity of the curable composition should not be too high. A sufficiently low viscosity may facilitate the production of filigree parts.

Due to the absence of acidic components, the curable composition is essentially neutral, i.e. the pH value—if brought in contact with water—is typically within a range from 6-8.

Due to the absence of inorganic fillers and pigments, the curable composition is fully combustible. That is, essentially no residues are left if the composition is heated to a temperature of 600 to 900° C.

Due to the presence of at least two dyes which show absorption bands in the visible spectrum, the curable composition is deeply coloured, i.e. it has a low transparency. This facilitates the controlling of the light during the printing process. However, the curable composition is typically not opaque.

Compared to commercially available compositions, the curable composition described in the present text is much more coloured. This allows the production of 3-dim composite articles being deeply coloured as well.

The resin of the chemical composition comprises one or more radiation curable components, one or more photo initiators and a dye composition comprising at least one dye D1 having a light absorption band in the blue/green spectral range and at least one dye D2 having a light absorption band in the green/yellow spectral range. Further, the dye(s) may have additional absorption bands in the UV region of the spectral range.

If desired, the radiation curable components can be characterized by one or more of the following features:

having a molecular weight in the range from 170 to 3,000 g/mol or from 200 to 2,500 g/mol or from 300 to 2,000 g/mol;

having a viscosity from 0.1 to 20 Pa*s or from 0.2 to 15 Pa*s or from 0.3 to 10 Pa*s at 23° C.

A low viscosity can facilitate the production process of the curable composition and may be beneficial for dissolving the other components contained in the composition.

The curable resin composition may comprise one or more radiation curable components as part of a resin composition.

If desired, the curable resin composition may comprise at least two, three or four different kinds of radiation curable components.

The radiation curable components typically comprise a backbone to which the radiation curable moieties are attached or bonded.

The radiation curable components typically comprise one or more (meth)acrylate(s) moieties as reactive group(s) or moiety.

The radiation curable component(s) comprise a backbone and reactive groups, wherein the radiation curable component(s) is typically characterized by one or more of the following features:
bearing one or more (meth)acrylate moieties as reactive groups;
bearing aromatic, aliphatic, or aromatic-aliphatic moieties in the backbone;
optionally bearing one or more urethane moieties in the backbone;
optionally bearing one or more hydroxyl groups in the backbone.

According to one embodiment, the (meth)acrylate(s) have free radically active functional groups and includes monomers, oligomers, and polymers having two or more ethylenically unsaturated groups.

The number of polymerizable groups can be in a range of 2 to 6 or even higher. In many embodiments, the number of polymerizable groups is in a range of 2 to 5 or 2 to 4. The polymerizable groups are typically (meth)acryloyl groups.

Exemplary monomers with two (meth)acryloyl groups include 1,2-ethanediol diacrylate, 1,3-propanediol diacrylate, 1,9-nonanediol diacrylate, 1,12-dodecanediol diacrylate, 1,4-butanediol diacrylate, 1,6-hexanediol diacrylate, butylene glycol diacrylate, bisphenol A diacrylate, diethylene glycol diacrylate, triethylene glycol diacrylate, tetraethylene glycol diacrylate, tripropylene glycol diacrylate, polyethylene glycol diacrylate, polypropylene glycol diacrylate, polyethylene/polypropylene copolymer diacrylate, polybutadiene di(meth)acrylate, propoxylated glycerin tri(meth)acrylate, and neopentylglycol hydroxypivalate diacrylate modified caprolactone.

Exemplary monomers with three or four (meth)acryloyl groups include, but are not limited to, trimethylolpropane triacrylate (e.g., commercially available under the trade designation TMPTA-N from Cytec Industries, Inc. (Smyrna, Ga., USA) and under the trade designation SR-351 from Sartomer (Exton, Pa., USA)), pentaerythritol triacrylate (e.g., commercially available under the trade designation SR-444 from Sartomer), ethoxylated (3) trimethylolpropane triacrylate (e.g., commercially available under the trade designation SR-454 from Sartomer), ethoxylated (4) pentaerythritol tetraacrylate (e.g., commercially available under the trade designation SR-494 from Sartomer), tris(2-hydroxyethylisocyanurate) triacrylate (e.g., commercially available under the trade designation SR-368 from Sartomer), a mixture of pentaerythritol triacrylate and pentaerythritol tetraacrylate (e.g., commercially available from Cytec Industries, Inc., under the trade designation PETIA with an approximately 1:1 ratio of tetraacrylate to triacrylate and under the trade designation PETA-K with an approximately 3:1 ratio of tetraacrylate to triacrylate), pentaerythritol tetraacrylate (e.g., commercially available under the trade designation SR-295 from Sartomer), and di-trimethylolpropane tetraacrylate (e.g., commercially available under the trade designation SR-355 from Sartomer).

Exemplary monomers with five or six (meth)acryloyl groups include, but are not limited to, dipentaerythritol pentaacrylate (e.g., commercially available under the trade designation SR-399 from Sartomer) and a hexa-functional urethane acrylate (e.g., commercially available under the trade designation CN975 from Sartomer). In some embodiments, the radiation curable component is a polar monomer.

As used herein, the term "polar monomer" refers to a monomer having a free radical polymerizable group and a polar group. The polar group is non-acidic and often contains a hydroxyl group, a primary amido group, a secondary amido group, a tertiary amido group, an amino group, or an ether group (i.e., a group containing at least one alkyleneoxy-alkylene group of formula —R—O—R— where each R is an alkylene having 1 to 4 carbon atoms).

Suitable optional polar monomers having a hydroxyl group include, but are not limited to, hydroxyalkyl (meth)acrylates (e.g., 2-hydroxyethyl (meth)acrylate, 2-hydroxypropyl (meth)acrylate, 3-hydroxypropyl (meth)acrylate, and 4-hydroxybutyl (meth)acrylate), and hydroxyalkyl (meth)acrylamides (e.g., 2-hydroxyethyl (meth)acrylamide or 3-hydroxypropyl (meth)acrylamide), ethoxylated hydroxyethyl (meth)acrylate (e.g., monomers commercially available from Sartomer (Exton, Pa., USA) under the trade designation CD570, CD571, and CD572), and aryloxy substituted hydroxyalkyl (meth)acrylates (e.g., 2-hydroxy-2-phenoxypropyl (meth)acrylate).

Exemplary polar monomers with a primary amido group include (meth)acrylamide. Exemplary polar monomers with secondary amido groups include, but are not limited to, N-alkyl (meth)acrylamides such as N-methyl (meth)acrylamide, N-ethyl (meth)acrylamide, N-isopropyl (meth)acrylamide, N-tert-octyl (meth)acrylamide, and N-octyl (meth)acrylamide. Exemplary polar monomers with a tertiary amido group include, but are not limited to, N-vinyl caprolactam, N-vinyl-2-pyrrolidone, (meth)acryloyl morpholine, and N,N-dialkyl (meth)acrylamides such as N,N-dimethyl (meth)acrylamide, N,N-diethyl (meth)acrylamide, N,N-dipropyl (meth)acrylamide, and N,N-dibutyl (meth)acrylamide.

Polar monomers with an amino group include various N,N-dialkylaminoalkyl (meth)acrylates and N,N-dialkylaminoalkyl (meth)acrylamides. Examples include, but are not limited to, N,N-dimethyl aminoethyl (meth)acrylate, N,N-dimethylaminoethyl (meth)acrylamide, N,N-dimethylaminopropyl (meth)acrylate, N,N-dimethylaminopropyl (meth)acrylamide, N,N-diethylaminoethyl (meth)acrylate, N,N-diethylaminoethyl (meth)acrylamide, N,N-diethylaminopropyl (meth)acrylate, and N,N-diethylaminopropyl (meth)acrylamide.

Exemplary polar monomers with an ether group include, but are not limited to, alkoxylated alkyl (meth)acrylates such as ethoxyethoxyethyl (meth)acrylate, 2-methoxyethyl (meth)acrylate, and 2-ethoxyethyl (meth)acrylate; and poly(alkylene oxide) (meth)acrylates such as poly(ethylene oxide) (meth)acrylates, and poly(propylene oxide) (meth)acrylates. The poly(alkylene oxide) acrylates are often referred to as poly(alkylene glycol) (meth)acrylates. These monomers can have any suitable end group such as a hydroxyl group or an alkoxy group. For example, when the end group is a methoxy group, the monomer can be referred to as methoxy poly(ethylene glycol) (meth)acrylate.

Suitable alkyl (meth)acrylates that can be used can have an alkyl group with a linear, branched, or cyclic structure. Examples of suitable alkyl (meth)acrylates include, but are not limited to, methyl (meth)acrylate, ethyl (meth)acrylate, n-propyl (meth)acrylate, isopropyl (meth)acrylate, n-butyl (meth)acrylate, isobutyl (meth)acrylate, n-pentyl (meth)acrylate, 2-methylbutyl (meth)acrylate, n-hexyl (meth)acrylate, cyclohexyl (meth)acrylate, 4-methyl-2-pentyl (meth)acrylate, 2-ethylhexyl (meth)acrylate, 2-methylhexyl (meth)acrylate, n-octyl (meth)acrylate, isooctyl (meth)acrylate, 2-octyl (meth)acrylate, isononyl (meth)acrylate, isoamyl (meth)acrylate, 3,3,5-trimethylcyclohexyl (meth)acrylate, n-decyl (meth)acrylate, isodecyl (meth)acrylate, isobornyl (meth)acrylate, 2-propylheptyl (meth)acrylate, isotridecyl (meth)acrylate, isostearyl (meth)acrylate, octadecyl (meth) acrylate, 2-octyldecyl (meth)acrylate, dodecyl (meth)acrylate, lauryl (meth)acrylate, and heptadecanyl (meth)acrylate.

It is also possible to use the methacrylic esters mentioned in U.S. Pat. No. 4,795,823, such as bis[3[4]-methacryloxymethyl-8(9)-tricyclo[5.2.1.0$^{2.6}$]decylmethyl triglycolate.

Particularly suitable are 2,2-bis-4(3-methacryloxy-2-hydroxypropoxy)phenylpropane (Bis-GMA), 2,2-bis-4(3-methacryloxypropoxy)phenylpropane, triethylene glycol dimethacrylate (TEGDMA), and di(meth)acrylates of bis-hydroxymethyltricyclo-(5.2.1.0$^{2.6}$)decane.

The radiation curable components are typically present in the following amounts:
Lower limit: at least 50 or at least 60 or at least 70 wt. %;
Upper limit: at most 98 or at most 95 or at most 90 wt. %;
Range: from 50 to 98 or from 60 to 95 or from 70 to 95 wt. %
wt. % with respect to the amount of the curable composition.

The curable composition described in the present text comprises a photo initiator.

The nature and structure of the photoinitiator is not particularly limited, either, unless the desired result cannot be achieved.

The photo initiator(s) can typically be characterized by one or more of the following features:
  showing light absorption band(s) in a wave length range from 300 to 450 nm;
  solubility in the curable composition: at least 2 g/l at 23° C.

The photo initiator typically absorbs light in the blue spectral range, e.g. in the range from 300 to 450 nm. This range typically overlaps with the additional absorption range(s) of dye D1 and/or dye D2.

The photo initiator should be soluble in in the radiation curable components of the curable resin composition described in the present text and/or the high boiling additive(s) described in the further text below.

The photo initiator is capable of generating free radicals for polymerization upon exposure to light energy having a wavelength between 300 and 450 nm.

The following classes of photoinitiator(s) can be used:
a) two-component system where a radical is generated through abstraction of a hydrogen atom from a donor compound;
b) one component system where two radicals are generated by cleavage.

Examples of photoiniators according to type (a) typically contain an alpha-diketon e.g. a moiety selected from benzophenone, xanthone or quinone in combination with an aliphatic amine.

Examples of photoinitiators according to type (b) typically contain a moiety selected form benzoin ether, acetophenon, benzoyl oxime or acyl phosphine.

Suitable systems are described e.g. in U.S. Pat. No. 4,071,124 and WO 2009/151957. The content of these references is herewith incorporated by reference.

A particularly suitable class of photo initiators include the class of acylphosphine oxides, as described e.g. in U.S. Pat. No. 4,737,593. Such acylphosphine oxides are of the general formula $(R^9)_2$—P(=O)—C(=O)—$R^{10}$ wherein each $R^9$ individually can be a hydrocarbyl group such as alkyl, cycloalkyl, aryl, and aralkyl, any of which can be substituted with a halo-, alkyl- or alkoxy-group, or the two $R^9$ groups can be joined to form a ring along with the phosphorous atom, and wherein $R^{10}$ is a hydrocarbyl group, an S-, O-, or N-containing five- or six-membered heterocyclic group, or a —Z—C(=O)—P(=O)—$(R^9)_2$ group, wherein Z represents a divalent hydrocarbyl group such as alkylene or phenylene having from 2 to 6 carbon atoms.

Preferred acylphosphine oxides are those in which the $R^9$ and $R^{10}$ groups are phenyl or lower alkyl- or lower alkoxy-substituted phenyl. By "lower alkyl" and "lower alkoxy" is meant such groups having from 1 to 4 carbon atoms.

Exemplary UV initiators include 1-hydroxycyclohexyl benzophenone (available, for example, under the trade designation "IRGACURE 184" from Ciba Specialty Chemicals Corp., Tarrytown, N.Y.), 4-(2-hydroxyethoxy)phenyl-(2-hydroxy-2-propyl) ketone (available, for example, under the trade designation "IRGACURE 2529" from Ciba Specialty Chemicals Corp.), 2-hydroxy-2-methylpropiophenone (available, for example, under the trade designation "DAROCURE D111" from Ciba Specialty Chemicals Corp. and bis(2,4,6-trimethylbenzoyl)-phenylposphineoxide (available, for example, under the trade designation "IRGACURE 819" from Ciba Specialty Chemicals Corp.).

Most preferably, the acylphosphine oxide is bis(2,4,6-trimethylbenzoyl)phenyl phosphine oxide (IRGACURE™ 819, Ciba Specialty Chemicals, Tarrytown, N.Y.).

Tertiary amine reducing agents may be used in combination with an acylphosphine oxide. Illustrative tertiary amines include ethyl 4-(N,N-dimethylamino)benzoate and N,N-dimethylaminoethyl methacrylate.

Commercially-available phosphine oxide photoinitiators capable of free-radical initiation when irradiated at wavelengths of greater than 400 nm to 1200 nm include a 25:75 mixture, by weight, of bis(2,6-dimethoxybenzoyl)-2,4,4-trimethylpentyl phosphine oxide and 2-hydroxy-2-methyl-1-phenylpropan-1-one (IRGACURE™ 1700, Ciba Specialty Chemicals), 2-benzyl-2-(N,N-dimethylamino)-1-(4-morpholinophenyl)-1-butanone (IRGACURE™ 369, Ciba Specialty Chemicals), bis(η5-2,4-cyclopentadien-1-yl)-bis (2,6-difluoro-3-(1H-pyrrol-1-yl)phenyl) titanium (IRGACURE™ 784 DC, Ciba Specialty Chemicals), a 1:1 mixture, by weight, of bis(2,4,6-trimethylbenzoyl)phenyl phosphine oxide and 2-hydroxy-2-methyl-1-phenylpropane-1-one (DAROCUR™ 4265, Ciba Specialty Chemicals), and ethyl-2,4,6-trimethylbenzylphenyl phosphinate (LUCIRIN™ LR8893X, BASF Corp., Charlotte, N.C.).

Also useful are photoinitiators comprising an alpha, beta-triketon moiety or comprising an alpha-diketon dialkyl ketal moiety.

The photoinitiator(s) is typically present in the following amounts:
Lower amount: at least 0.01 or at least 0.05 or at least 0.1 wt.-%;
Upper amount: at most 5 or at most 3 or at most 2 wt.-%;
Range: from 0.01 to 5 or from 0.01 to 3 wt.-% or 0.01 to 2 wt.-%;
wt.-% with respect to the weight of the whole composition.

The curable composition described in the present text comprises an organic dye composition. The dye composition comprises at least two different dyes D1 and D2.

It was found that using this particular combination of dyes contributes to supress or to lower the transmission of scattered light in the curable composition. This often helps to improve the accuracy or detail resolution of the surface of the article obtained from the additive manufacturing process.

The organic dye does typically not contain elements or ions other than alkaline metal ions (e.g. Li, Na, K), earth alkaline metal ions (e.g. Mg, Ca), C, N, O, H, S, P, halogen (F, Cl, Br). That is, the organic dye molecule does typically not contain any heavy metal ions (e.g. metal ions having an atomic mass above 40 or above 45.

Dyes which can be used include those containing a moiety selected form azo groups and/or aromatic (hetero) cycles or other systems with delocalized pi-electrons. In particular dyes useful for colouring food were found to be useful.

Dye D1 has a light absorption maximum within a wave length range from 400 to 530 nm.

If desired, dye D1 can be further characterized by at least one or more of the following features:
showing a light absorption band within a wave length range from 300 to 450 nm;
molecular weight: from 50 to 1,000 g/mol;
solubility in curable composition at least 0.1 g/l at 23° C.;
combustible without residues within a temperature range from 600 to 900° C.;
comprising an anthraquinone moiety, azo moiety, naphthoquinolinedione moiety, or xanthenone moiety.

Thus, dye 1 may also have a light absorption band within a wave length range from 300 to 450 nm, that is, in the UV region.

Such an absorption can be advantageous as it corresponds or overlaps essentially with the emission band(s) of the light of the devices which are used for the additive manufacturing technique.

A combination of light absorption in the regions 300 to 450 nm and 450 to 650 nm was found to be particular useful.

Typically, dye D1 shows a light absorption band in the same range of the electromagnetic spectrum where the photo initiator shows light absorption as well.

Dye D1 is typically soluble in organic solvents and also in the curable resin composition.

According to one embodiment dye D1 comprises an anthraquinone moiety and can thus be characterized as anthraquinone dye.

According to one embodiment dye D1 comprises an azo moiety and can thus be characterized as azo dye.

According to one embodiment dye D1 comprises a naphthoquinolinedione moiety and can thus be characterized as naphthoquinolinedione dye.

According to one embodiment dye D1 comprises a xanthenone moiety and can thus be characterized as xanthenone dye.

According to one embodiment dye D1 comprises an isoquinoline moiety and can thus be characterized as isoquinoline dye.

A suitable example for dye D1 is C.I. Solvent Red 111 (e.g. Solvaperm™ Red PFS; CAS 82-38-2).

Other suitable examples of dye D1 include Solvent Red 168 (CAS 71832-19-4, anthraquinone dye), Solvent Red 49 (CAS 509-34-2, xanthenone dye), Solvent Red 140 (CAS 15905-32-5, xanthenone dye), Pigment Red 112 (CAS 6535-46-2, azo dye), Pigment Red 149 (CAS 4948-15-6, perylene dye), Solvent Red 19 (CAS 6368-72-5, azo dye), Solvent Red 23 (CAS 85-86-9, azo dye), Solvent Red 24 (CAS 85-83-6, azo dye), Solvent Red 26 (CAS 4477-79-6, azo dye), Solvent Red 27 (CAS 1320-06-5, azo dye), Solvent Red 43 (CAS 15086-94-9, xanthenone dye), Solvent Red 52 (CAS 81-39-0, isoquinoline dione dye) and mixtures thereof.

Dye D1 is typically present in the following amounts:
Lower limit: at least 0.01 or at least 0.04 or at least 0.08 wt. %;
Upper limit: utmost 0.1 or utmost 0.5 or utmost 1 wt. %;
Range: from 0.01 to 1 or from 0.04 to 0.5 wt. % or from 0.08 to 0.1 wt. %;
wt. % with respect to the weight of the curable composition.

Dye D2 shows a light absorption maximum within a wave length range from 540 to 650 nm. Thus, dye D2 absorbs light in the green-yellow part of the spectrum (e.g. 500 to 650 nm).

If desired, dye D2 can be further characterized by at least one or more of the following features:
showing a light absorption band at a wave length range from 300 to 450 nm;
molecular weight: from 50 to 1,000 g/mol;
solubility in curable composition: at least 0.05 g/l at 23° C.;
optionally combustible without residues at temperature below 800° C.;
comprising an anthraquinone moiety, azo moiety, or triphenylmethane moiety.

That is, dye 2 may also have a light absorption band at a wave length range from 300 to 450 nm, that is in the UV region.

Such an absorption can be advantageous as it corresponds or overlaps essentially with the emission band(s) of the light of the devices which are used for the additive manufacturing technique.

A combination of light absorption in the region 300 to 450 nm and 500 to 650 nm was found to be particular useful.

According to another embodiment, dye D2 shows light absorption within a wave length range from 300 to 400 nm having an intensity being at least 20% compared to the intensity of the light absorption within a wave length range from 540 to 650 nm.

Dye D2 is typically soluble in organic solvents and also in the curable resin composition.

According to one embodiment dye D2 comprises an anthraquinone moiety and can thus be characterized as anthraquinone dye.

According to one embodiment dye D2 comprises an azo moiety and can thus be characterized as azo dye.

According to one embodiment dye D2 comprises a triphenylmethane moiety and can thus be characterized as triphenylmethane dye.

According to one embodiment dye D2 comprises a phenoxazine moiety and can thus be characterized as phenoxazine dye.

A suitable example for dye D2 is C.I. Solvent Violet 13 (e.g. Macrolex™ Violett B, CAS 81-48-1).

Other suitable examples of dye D2 include C.I. Solvent Blue 97, Solvent Blue 35 (CAS 17354-14-2, anthraquinone dye), Solvent Blue 36 (CAS 14233-37-5, anthraquinone dye), Solvent Blue 58 (CAS 29887-08-9, anthraquinone dye), Solvent Blue 59 (CAS 6994-46-3, anthraquinone dye), Solvent Blue 97 (CAS 32724-62-2, anthraquinone dye), Solvent Blue 128 (CAS 18038-99-8, anthraquinone dye), Mordant Blue 14 (CAS 1562-90-9, phenoxazine dye), Gallocyanine (CAS 1562-85-2, phenoxazine dye), Disperse Violet 26 (CAS 6408-72-6, anthraquinone dye), Solvent Violet 8 (CAS 52080-58-7, triphenylmethane dye), Solvent Violet 14 (CAS 8005-40-1, anthraquinone dye), Solvent Violet 38 (CAS 68239-76-9, anthraquinone dye), and mixtures thereof.

Dye D2 is typically present in the following amounts:
Lower limit: at least 0.01 or at least 0.02 or at least 0.04 wt. %;
Upper limit: utmost 0.1 or utmost 0.5 or utmost 1 wt. %;
Range: from 0.01 to 1 or from 0.02 to 0.5 wt. % or from 0.04 to 0.1 wt. %.
wt. % with respect to the weight of the curable composition.

The ratio of dye D1 to dye D2 in the curable composition is typically in the range from 0.1:1 to 3:1 or from 0.25:1 to 3:1 or 1:1 to 3:1 or from 1:1 to 2:1 or from 1.1:1 to 3:1 with respect to weight.

According to one embodiment, dye D1 is used in excess compared to dye D2.

Such a ratio was found to be beneficial because it allows an easier adjustment of the desired colour of the curable composition.

The curable composition described in the present text may also comprise one or more additive(s), including high boiling additive(s), stabilizer(s), or mixtures thereof.

According to one embodiment, the curable composition for use in the additive manufacturing process described in the present text may also comprise one or more high boiling additives.

The nature and structure of the high boiling additive is not particularly limited unless the desired result cannot be achieved.

In certain embodiments the high boiling additive(s) can be characterized by at least one or more, sometimes all of the following parameters:
Boiling point: above 100 or above 200 or above 250 or above 300° C.;
Molecular weight: from 100 to 500 g/mol or from 150 to 450 g/mol or from 200 to 400 g/mol;
Viscosity: from 0.1 to 50 or from 0.2 to 10 or from 0.3 to 5 mPa*s (23° C.);
miscible with the radiation curable components.

Using a high boiling additive with a boiling point above 100 or above 200 or above 250 or above 300° C. can be beneficial for the mixing process of the curable composition.

Using a high boiling additive with a molecular weight and/or viscosity in the above range can be beneficial as it may help to adjust the viscosity of the curable composition.

Further, using a high boiling additive may help to facilitate the burn-out process, in case the 3-dim article obtained is used for producing another 3-dim article by an investment casting process as described below.

According to one embodiment, the high boiling additive is often an alcohol or a glycol or polyglycol, mono-ether glycol or mono-ether polyglycol, di-ether glycol or di-ether polyglycol, ether ester glycol or ether ester polyglycol, carbonate, ester or a polycaprolactone. The organic high boiling point additives usually have one or more polar groups. The organic high boiling point additive does not have a polymerizable group; that is, the organic high boiling point additive is free of a group that can undergo free radical polymerization. Further, no component of the high boiling point additive medium has a polymerizable group that can undergo free radical polymerization.

Suitable glycols or polyglycols, mono-ether glycols or mono-ether polyglycols, di-ether glycols or di-ether polyglycols, and ether ester glycols or ether ester polyglycols are often of the following formula:

$R^1O—(R^2O)_n—R^1$

In the above formula each $R^1$ independently is hydrogen, alkyl, aryl, or acyl. Suitable alkyl groups often have 1 to 10 carbon atoms, 1 to 6 carbon atoms, or 1 to 4 carbon atoms. Suitable aryl groups often have 6 to 10 carbon atoms and are often phenyl or phenyl substituted with an alkyl group having 1 to 4 carbon atoms. Suitable acyl groups are often of formula —(CO)$R^a$ where $R^a$ is an alkyl having 1 to 10 carbon atoms, 1 to 6 carbon atoms, 1 to 4 carbon atoms, 2 carbon atoms, or 1 carbon atom. The acyl is often an acetyl group (i.e. —C(O)CH$_3$). In the above formula, each $R^2$ is typically an alkylene group such as ethylene or propylene. The variable n is at least 1 and can be in a range of 1 to 10, 1 to 6, 1 to 4, or 1 to 3.

Glycols or polyglycols of the above formula have two $R^1$ groups equal to hydrogen. Examples of glycols include, but are not limited to, ethylene glycol, propylene glycol, diethylene glycol, dipropylene glycol, triethylene glycol, and tripropylene glycol.

Mono-ether glycols or mono-ether polyglycols of the above formula have a first $R^1$ group equal to hydrogen and a second $R^1$ group equal to alkyl or aryl. Examples of mono-ether glycols or mono-ether polyglycols include, but are not limited to, ethylene glycol monohexyl ether, ethylene glycol monophenyl ether, propylene glycol monobutyl ether, diethylene glycol monomethyl ether, diethylene glycol monoethyl ether, diethylene glycol monopropyl ether, diethylene glycol monobutyl ether, diethylene glycol monohexyl ether, dipropylene glycol monomethyl ether, dipropylene glycol monoethyl ether, dipropylene glycol monopropyl ether, triethylene glycol monomethyl ether, triethylene glycol monoethyl ether, triethylene glycol monobutyl ether, tripropylene glycol monomethyl ether, and tripropylene glycol monobutyl ether.

Di-ether glycols or di-ether polyglycols of the above formula have two R1 group equal to alkyl or aryl. Examples of di-ether glycols or di-ether polyglycols include, but are not limited to, ethylene glycol dipropyl ether, ethylene glycol dibutyl ether, dipropylene glycol dibutyl ether, diethylene glycol dimethyl ether, diethylene glycol diethyl ether, triethylene glycol dimethyl ether, tetraethylene glycol dimethyl ether, and pentaethylene glycol dimethyl ether.

Ether ester glycols or ether ester polyglycols of the above formula have a first R1 group equal to an alkyl or aryl and a second R1 group equal to an acyl. Examples of ether ester glycols or ether ester polyglycols include, but are not limited to, ethylene glycol butyl ether acetate, diethylene glycol butyl ether acetate, and diethylene glycol ethyl ether acetate.

Other suitable organic high boiling additives are carbonates of the following formula:

In the above formula, $R^3$ is hydrogen or an alkyl such as an alkyl having 1 to 4 carbon atoms, 1 to 3 carbon atoms, or 1 carbon atom. Examples include ethylene carbonate and propylene carbonate.

Suitable are also polycaprolactones, in particular polycaprolactones having a molecular mass in the range from 200 to 1,000 or from 300 to 800 or 400 to 600 g/mol.

Polycaprolactones are typically the reaction products of caprolactone with diols or triols. Typcial examples of diols include butanediol, hexanediol, diethylene glycol. A typical example of a triol includes trimethylolpropane.

Specific examples of high boiling point additives which can be used include: mono alcohols (e.g. $C_6$ to $C_{12}$ alcohols, including primary, secondary and tertiary alcohols), poly alcohols (e.g. diethylene glycol ethyl ether (Carbitol™), hexanediol, octanediol, decanediol, dodecanediol), and mixtures thereof.

The following high boiling additives are sometimes preferred: polyethylene glycol, polycaprolactone, 1-decanol, diethylene glycol ethyl ether, and mixtures thereof. In some situations, suitable high boiling additives may also include low boiling alcohols (below 100° C.; like methanol, ethanol, propanol) and mixtures thereof or preferably the same high boiling additive(s) described above.

The high boiling additive(s) is typically present in the following amounts:
Lower amount: 0 or at least 1 or at least 5 wt.-%;
Upper amount: at most 40 or at most 30 or at most 20 wt.-%;
Range: from 0 to 40 or from 1 to 30 or from 5 to 20 wt.-%;
wt.-% with respect to the weight of the curable composition.

According to a further embodiment, the curable composition described in the present text comprises one or more stabilizer(s).

The nature and structure of the stabilizer(s) is not particularly limited, either, unless the desired result cannot be achieved.

A stabilizer may extend the shelf life of the curable composition, help prevent undesired side reactions, and adjust the polymerization process of the radiation curable component(s) present in the curable composition.

Adding one or more stabilizer(s) to the curable composition may further help to improving the accuracy or detail resolution of the surface of the 3-dim article to be produced.

In particular it was found that adding stabilizer(s) to the curable composition described in the present text may help to enhance the resolution and accuracy of the SLA process by attenuating or avoiding unwanted scattering effects, as well as increase the shelf life of the curable composition. Stabilizer(s) which can be used often comprise a phenol moiety.

Specific examples of stabilizer(s) which can be used include: p-methoxyphenol (MOP), hydroquinone monomethylether (MEHQ), 2,6-di-tert-butyl-4-methyl-phenol (BHT; Ionol), phenothiazine, 2,2,6,6-tetramethyl-piperidine-1-oxyl radical (TEMPO) and mixtures thereof.

If present, the stabilizer(s) is present in the following amounts:
Lower amount: at least 0.001 or at least 0.005 or at least 0.01 wt.-%;
Upper amount: at most 0.02 or at most 0.05 or at most 0.5 at most 1 wt.-%;
Range: from 0.001 to 1 or from 0.005 to 0.05 wt.-%;
wt.-% with respect to the weight of the curable composition.

The curable composition described in the present text does typically not comprise either or all of the following components:
Filler(s) in an amount of more than 1 wt. % or more than 0.1 wt. %;
Inorganic pigment(s) in an amount of more than 1 wt. % or more than 0.1 wt. %;
Component(s) comprising elements other than C, H, O, N, S, P, F, Cl, Br in an amount of more than 1 wt. % or more than 0.1 wt. %;
wt. % with respect to the weight of the whole composition.

Thus, the curable composition described in the present text is essentially free of either or all of the above components.

If present, these components may not completely burn out and may cause difficulties in particular with respect to surface accuracy in a casting process (so-called "lost-wax technique") to be conducted later.

Suitable curable compositions include the following embodiments:

Embodiment 1 radiation curable component(s) from 50 to 98 wt. %,
photo initiator from 0.5 to 10 wt. %,
dye D1 from 0.01 to 1 wt. %,
dye D2 from 0.01 to 1 wt. %,
high boiling additive from 0 to 20 wt. %,
wt. % with respect to the weight of the whole composition,
wherein the components are as described in the present text.

Embodiment 2 radiation curable component(s) from 60 to 98 wt. %,
photo initiator from 0.5 to 5 wt. %,
dye D1 from 0.01 to 1 wt. %,
dye D2 from 0.01 to 1 wt. %,
high boiling additive from 0.1 to 20 wt. %,
wt. % with respect to the weight of the whole composition,
wherein the components are as described in the present text.

Embodiment 3 radiation curable component(s) from 70 to 98 wt. %,
photo initiator from 0.5 to 3 wt. %,
dye D1 from 0.01 to 1 wt. %,
dye D2 from 0.01 to 1 wt. %,
high boiling additive from 1 to 20 wt. %,
wt. % with respect to the weight of the whole composition,
wherein the components are as described in the present text.

According to a preferred embodiment, the curable composition described in the present text comprises:
radiation curable components comprising a (meth)acrylate moiety and being present in an amount from 50 to 96 wt. %,
photo initiator comprising a phosphine oxide moiety and being present in an amount from 0.5 to 10 wt. %,
dye D1 comprising an anthraquinone moiety and being present in an amount from 0.01 to 1 wt. %,
dye D2 comprising an anthraquinone moiety and being present in an amount from 0.01 to 1 wt. %,
high boiling additive having a molecular weight from 100 to 500 g/mol being present in an amount from 1 to 20 wt. %,
the curable composition not comprising
filler(s) in an amount of more than 1 wt. %;
inorganic pigment(s) in an amount of more than 1 wt. %;
component(s) comprising elements other than C, H, O, N, S, P, Hal in an amount of more than 1 wt. %;
wt. % with respect to the weight of the whole composition.

The curable composition described in the present text is typically produced by combining the respective components and mixing them. For mixing a speed mixer can be used, if desired.

The production is typically carried out under save-light conditions.

The curable composition described in the present text is typically stored in container. Suitable containers include vessels, foil bags, cartridges, etc.

The volume of the respective containers is not particularly limited, but is typically in a range from 10 to 200,000 ml or from 500 to 10,000 ml.

The curable composition described in the present text can also be provided as a kit of parts comprising the curable composition and an instruction of use.

The instruction of use typically describes under what conditions the curable composition should be used.

The invention is also directed to a process of producing a 3-dim composite article, the process comprising the step of processing the curable composition described in the present text as construction material in an additive manufacturing process, in particular by stereolithography.

Such a process typically comprises the following steps:
providing a layer of the construction material on a surface,
radiation curing those parts of the layer of construction material which will belong to the 3-dim article to be produced,
providing an additional layer of the construction material in contact with the radiation cured surface of the previous layer,
repeating the previous steps until a 3-dim article is obtained.

Such a process comprises the step of applying radiation to the surface of a radiation curable material, wherein the radiation is applied only to those parts of the surface which will later form a part of the article to be produced.

Radiation can be applied by using e.g. a laser beam or by mask-image projection. Using a mask-image projection based stereolithographie process (MIP-SL) is sometimes preferred, as it allows a more rapid manufacturing of the article.

A MIP-SL process can be described as follows:
i. A three-dimensional digital model of the article to be produced is provided.
ii. The three-dimensional digital model is sliced by a set of horizontal planes.
iii. Each thin slice is converted into a two-dimensional mask image.
iv. The mask image is then projected with the aid of a radiation source onto the surface of the radiation curable material being located in a building platform (e.g. having the shape of a vat).
v. The radiation curable material is only cured in those regions which are exposed.
vi. The building platform containing the radiation curable material or the layer of cured material is moved relative to the radiation source, wherein a new layer of radiation curable material is provided being in contact with the layer of the cured material produced in the previous step.
vii. Steps (iv) to (vi) are repeated until the desired article is formed.

Projecting the mask image on the radiation curable material can be done either top-down or bottom-up with respect to the orientation of the vat.

Using the bottom-up technique can be beneficial as less radiation curable material is needed.

It was found that the curable composition described in the present text is in particular useful for processing it in a mask-image projection stereolithography process using the bottom-up projection technique.

The invention is also directed to 3-dim composite article obtained or or obtainable according to the process of the present text.

The article can typically be characterized by one or more of the following features:
transmission: less than 20% or less than 15% for a path length of 1 mm;
colour impression: black at a layer thickness of 2 mm or more;
hue h°: below 30 or below 28 or below 25 determined for a path length of 5 mm in transmission mode according to the CIELCh colour system;
chroma C*: less than 20 or less than 18 or less than 15 determined for a path length of 5 mm in transmission mode according to the CIELCh colour system;
combustible within a temperature range of 800 to 950° C. without residues.

That is, the obtained 3-dim composite article has a black colour. The black colour is basically caused by the presence of the dyes D1 and D2 absorbing a huge part of the visible electromagnetic spectrum.

The black colour of the 3-dim composite article facilitates the visual inspection of the surface of the 3-dim composite article and also allows an easy determination of parts which belong to the desired 3-dim composite article and parts which are produced during the additive manufacturing process either by purpose as support structure or by accident, e.g. due to light scattering.

It was found that such a hue value is in particular beneficial for visually inspecting the 3-dim article even with light from behind (rear light conditions).

The invention is also directed to a process of producing a 3-dim cast article, the process comprising the steps of:
Processing the curable composition described in the present text in an additive manufacturing process to obtain a 3-dim composite article,
Embedding the 3-dim composite article in an investment material,
Replacing the material of the 3-dim composite article by a casting material to obtain a 3-dim cast article embedded in the investment material,
Removing the investment material from the 3-dim cast article.

An investment material which can be used includes gypsum.

Casting materials which can be used include metals like gold, silver, platinum, dental alloys based on either or all of the elements chromium, cobalt and molybdenum, like Wironit™, and mixtures thereof.

Such a process can be used for producing 3-dim cast articles having the shape of dental articles, orthodontic articles or other small parts including jewellery.

Besides investment casting, the curable composition described in the present text can also be used for making parts for model making, in particular for making 3-dim articles having small dimensions, e.g. 0.5 to 100 mm or 0.5 to 50 mm or 0.5 to 10 mm in x, y and/or z-direction.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. The above specification, examples and data provide a description of the manufacture and use of the compositions and methods of the invention. The invention is not limited to the embodiments disclosed herein. One skilled in the art will appreciate that many alternative embodiments of the invention can be made without departing from the spirit and scope of thereof.

The following examples are given to illustrate, but not limit, the scope of this invention.

EXAMPLES

Unless otherwise indicated, all parts and percentages are on a weight basis, all water is de-ionized water, and all molecular weights are weight average molecular weight. Moreover, unless otherwise indicated all experiments were conducted at ambient conditions (23° C.; 1013 mbar).

Methods

Method for Determining Light Transmission

If desired, the light transmission (contrast ratio mode) can be measured using a Color i7 spherical spectrophotometer (available from x-rite Inc., Grand Rapids, Mich., USA).

The test specimen is printed in the shape of a cuboid with approximate dimensions: edge length of 30±0.5 mm and thickness of 1±0.05 mm and processed as described in the present text.

For the measurement, the spectrometer parameters are: D65 illuminant (light source; day light; 6,500 K) and 10° observer. The white and black background is determined as followed: for the black background the sphere is closed and thereby no light is detected by the sensors of the Color i7. As white (or 100% D65 light) a measurement, without anything between sphere and sensors of the Color i7, is necessary. For measurement of the sample, the specimen is placed with a sample holder between sphere and lens of the Color i7. The specimen is thereby directly placed onto the aperture of the sphere. Transmission (% T) is calculated using the Software Color iControl V7.5.10.

Colour Measurement in Transmission Mode

If desired, the colour in transmission can be measured by using a spherical spectrophotometer Colour i7 (available from x-rite Inc., Grand Rapids, Mich., USA).

Therefore, the configuration of the spectrophotometer Color i7 according to the method for determining light transmission is used.

The test specimen is printed in the shape of a cuboid with approximate dimensions: edge length of 30±0.5 mm and thickness of 5±0.05 mm and processed as described in the present text.

Colour values L*, a*, b*, C* and h° (Hue) are calculated by the software of the Color i7. The calculation of these values are according to the CIE standards. C* is the vector of a* and b* and can be seen as a summary of them. h° (Hue) describes the place of colour within a 360° circle. Values around 0° indicate a red colour. Values between 300° and 360° indicate a purple or a transition between a purple and red colour. A chroma (C*) of 0 indicates a colourless object.

Method for Determining Light Absorption Bands

If desired, the light absorption spectrum can be determined by using a spectrophotometer Spectramax 190 (available from Molecular Devices LLC., Sunnyvale, Calif., USA). As cuvette a multicuvette is used like Microtest 96-Well 370 µl Clear Plate (available from BD Biosciences Franklin Lakes, N.J., USA). 200 µl of mentioned resin solutions are placed into one of the 96 cuvettes and put into the Spectromax 190. The spectrum is recorded between 200 nm and 800 nm in 1 nm steps.

Viscosity

If desired, the viscosity can be measured using a Physica Rheometer MCR 301 device with a plate/cone system (diameter 25 mm and angle)1° and a slit of 0.05 mm. The viscosity values (Pas) can be recorded at 23° C. for each shear rate (starting from 0.1 l/s to 100 l/s in 50 exponential increasing steps). For each shear rate, a delay of 5 s is typically used before collecting data. Also the viscosity values can be recorded at a constant shear of 10 l/s and an increasing temperature ramp (starting at 23° C. to 60° C. in 0.74° C. steps). The above mentioned method of measurement corresponds essentially to DIN 53018-1.

Method for Determining pH-Value

If desired, the measurement of the pH-value can be achieved by means known by the person skilled in art. E.g. the resin can be dispersed in de-ionized water and an instrument like Metrohm™ 826 can be used. Alternatively, wet (water) pH sensitive paper or wet (water) pH sensitive sticks can be used if resins are not coloured.

Method for Determining Printing Accuracy/Visual Inspection

The printing accuracy can be determined by visually inspecting the obtained 3-dim articles by using the following protocol. The 3-dim articles were inspected in normal room lighting in front of a white background (regular white printing paper) using Binocular magnifiers for spectacles at a magnification of 2.75× (Fa Fino).

The visual inspection is categorized using the following criteria:

| Rating | Criteria |
| --- | --- |
| ++ | All structures and every detail very good visible, very good contrast and/or opacity. |
| + | All structures and details visible, contrast and/or opacity sufficient. |
| − | Structures visible, details partially not clearly visible, contrast and/or opacity too low. |
| −− | Structures and details not clearly visible, contrast and/or opacity not sufficient. |

Materials

TABLE 1

| Name | Description | Abbreviation |
| --- | --- | --- |
| Irgacure ™ 819 | Photo initiator; phosphine oxide, CAS 162881-26-7 | Ini 1 |
| Lucirin ™ TPO, Irgacure ™ TPO | Photo initiator; phosphine oxide, CAS 75980-60-8 | Ini 2 |
| Macrolex ™ Violett B | Dye 2, Anthraquinone Dye, C.I. SOLVENT VIOLET 13, CAS 81-48-1 | Dye 2 |
| Solvaperm ™ Rot PFS | Dye 1, Anthraquinone Dye, C.I. SOLVENT RED 111, CAS 82-38-2 | Dye 1 |
| PEG 200 | High Boiling Additive, Polyethylene glycol 200, CAS 25322-68-3 | Add 1 |
| CAPA 400 | High Boiling Additive, 2-Oxepanone Polymer with 1,4-Butanediol, CAS 31831-53-5 | Add 2 |
| 1-Decanol | High Boiling Additive, CAS 112-30-1 | Add 3 |
| TEGDMA | Radiation curable component, Dimethacrylate Monomer, Triethyleneglycol Dimethacrylate, CAS 109-16-0 | Comp 1 |
| HEMA | Radiation curable component, Monomethacrylate Monomer, 2-Hydroxyethyl Methacrylate, CAS | Comp 2 |
| HPMA | Radiation curable component, Monomethacrylate Monomer, mixture of Hydroxypropyl Methacrylates, CAS 27813-02-1 | Comp 3 |

TABLE 1-continued

| Name | Description | Abbreviation |
|---|---|---|
| GDMA | Radiation curable component, Dimethacrylate Monomer, Glycerol-1,3-dimethacrylate, CAS 1830-78-0 | Comp 4 |
| UDMA | Radiation curable component, Dimethacrylate Monomer, mixture of Trimethyl-4,13-dioxo-3,14-dioxa-5,12-diaza-hexadecane-1,16-diole Dimethacrylat, CAS 72869-86-4 | Comp 5 |
| BPA4EO-DMA | Radiation curable component, Dimethacrylate Monomer, BisPhenol A Ethoxylate Dimethacrylate, CAS 41637-38-1 | Comp 6 |
| Tetrahydrofurfuryl Acrylate | Radiation curable component, Monoacrylate Monomer, CAS 2399-48-6 | Comp 7 |
| DESMA | Urethane Methacrylate Oligomer, Oligomethacrylate Monomer, CAS 1101874-33-2 | Comp 8 |
| 4DMA | 1,12-Dodecanediol Dimethacrylate, Dimethacrylate Monomer, CAS 72829-09-5 | Comp 9 |
| Lumilux ™ Blue LZ | Organic luminescence Pigment, CAS 658084-50-5 | Pigm 1 |
| Lumilux ™ Yellow LZ | Organic luminescence Pigment, Honeywell SEC52056 | Pigm 2 |
| Drewe ™ FotoDent LED.A Pattern | Radiation curable, commercially available cast resin for Additive Manufacturing | Prod 1 |
| Deltamed ™ PLASTCure Cast 200 | Radiation curable, commercially available cast resin for Additive Manufacturing | Prod 2 |

General Process for Producing Curable Compositions

The respective components were placed in a vessel and mixed under save-light conditions and processed according to the general process described above.

General Process for Producing 3-dim Articles

The respective curable composition (e.g. about 20 ml) was placed in the printing vat of a S30 3D-Printer (Rapid Shape GmbH, Heimsheim, Germany).

The CAD data for the 3-dim article to be printed was loaded into the system. For testing the printing accuracy the CAD data of a set of orthodontic brackets was used.

The following parameters were used for conducting the printing process:

Layer thickness: in z-direction: 50 μm;
LED light source: 405 nm wavelength with 50 mW/cm² intensity for 11 sec. to every layer.

After the printing process was finished, the 3-dim article was removed from the printing vat, cleaned with iso-propanole in an ultra-sonic bath for 5 min and then postcured for 90 sec. in an Otoflash G171 (NK Optik GmbH, Baierbrunn, Germany) without N₂ flooding.

Figure 1:
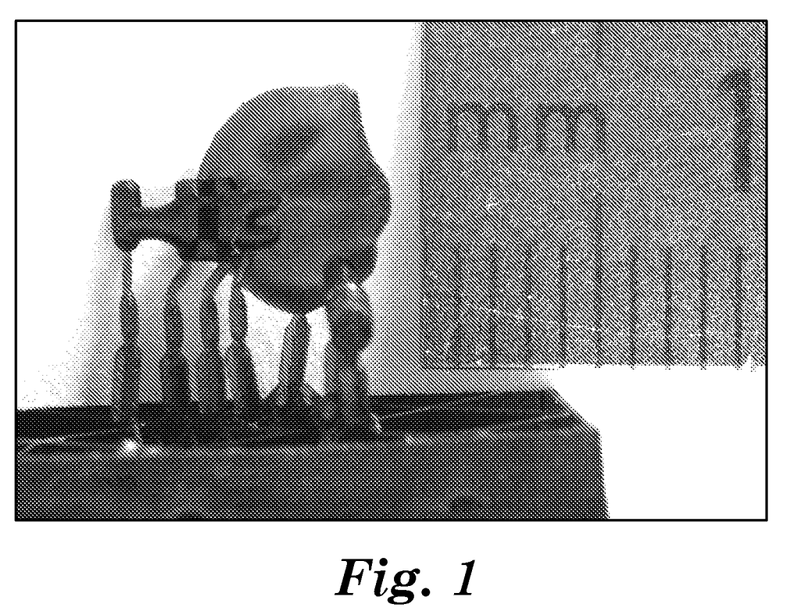
FIG. 1 shows an embodiment of a printed sample obtained from a curable composition according to the invention.
Figure 2:
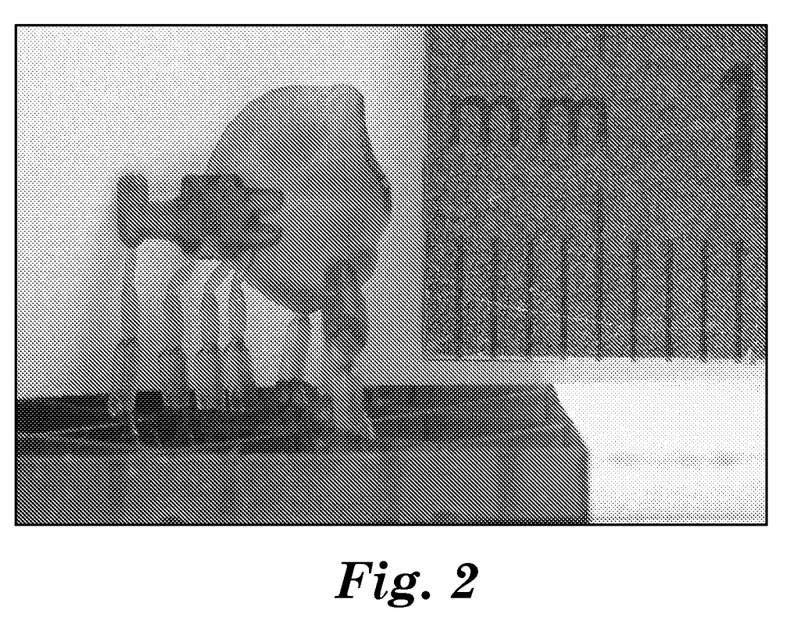
FIGS. 2, 3 and 4 show embodiments of printed samples obtained from comparative curable compositions.
Figure 3:
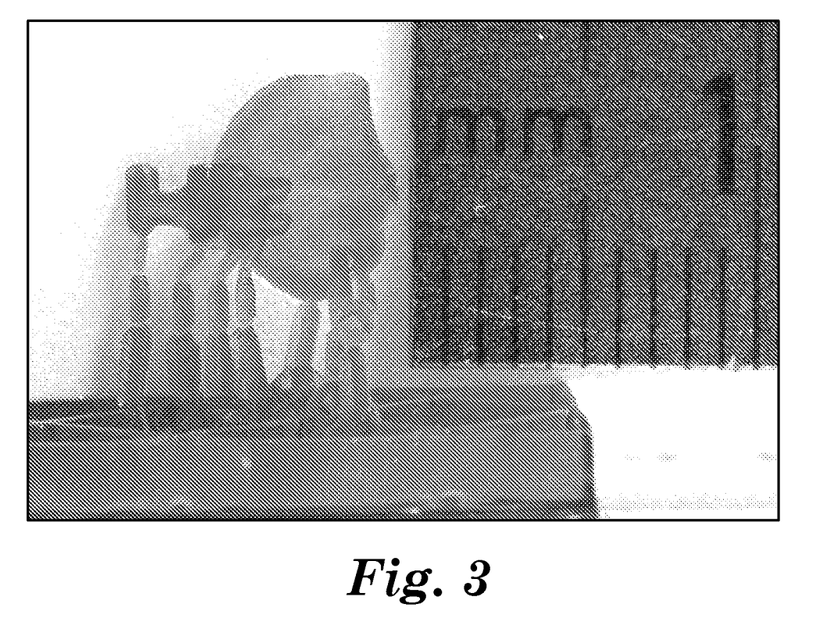
Figure 4:
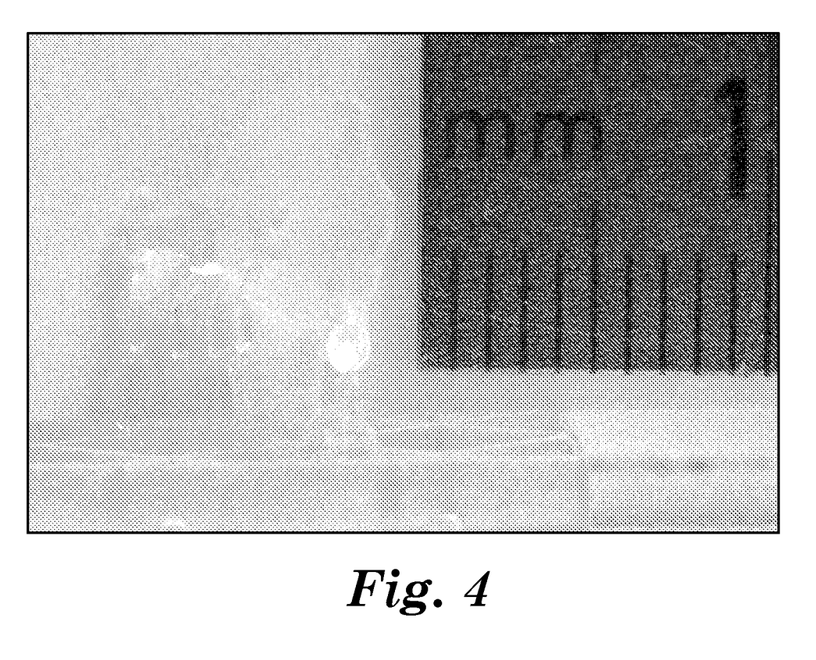

Photographs of printed samples are shown in FIGS. 1 to 4.

INVENTIVE EXAMPLES (IE)

|  | IE 1 | IE 2 | IE 3 | IE 4 | IE 5 |
|---|---|---|---|---|---|
| Comp 1 |  |  | 39.40 | 39.40 | 34.53 |
| Comp 2 |  |  |  |  |  |
| Comp 3 |  | 10.00 |  |  |  |
| Comp 4 |  |  |  |  |  |
| Comp 5 |  |  | 59.71 | 59.71 | 56.33 |
| Comp 6 | 83.59 | 83.60 |  |  |  |
| Comp 7 | 12.49 |  |  |  |  |
| Comp 8 |  |  |  |  |  |
| Comp 9 |  |  |  |  |  |
| Add 1 | 2.20 |  |  |  |  |
| Add 2 |  | 4.68 |  |  |  |
| Add 3 |  |  |  |  | 8.25 |
| Ini 1 | 1.60 | 1.60 | 0.80 | 0.80 | 0.80 |
| Ini 2 |  |  |  |  |  |
| Dye 2 | 0.04 | 0.04 | 0.02 | 0.02 | 0.02 |
| Dye 1 | 0.08 | 0.08 | 0.04 | 0.04 | 0.04 |
| Pigm 1 |  |  | 0.03 |  | 0.03 |
| Pigm 2 |  |  |  | 0.03 |  |
| visual inspection | ++ (FIG. 1) | ++ | + | + | + |

|  | IE 6 | IE 7 | IE 8 | IE 9 | IE 10 |
|---|---|---|---|---|---|
| Comp 1 |  |  |  |  |  |
| Comp 2 | 12.56 |  |  |  |  |
| Comp 3 |  |  |  |  |  |
| Comp 4 | 25.11 | 27.24 | 27.24 | 45.44 |  |
| Comp 5 | 61.46 | 63.55 | 63.55 |  |  |
| Comp 6 |  |  |  |  |  |
| Comp 7 |  |  |  |  |  |
| Comp 8 |  |  |  | 45.44 | 81.79 |
| Comp 9 |  |  |  |  | 9.09 |
| Add 1 |  | 8.25 |  | 8.25 |  |
| Add 2 |  |  |  |  |  |
| Add 3 |  |  | 8.25 |  | 8.25 |
| Ini 1 | 0.80 | 0.80 | 0.80 | 0.80 | 0.80 |
| Ini 2 |  |  |  |  |  |
| Dye 2 | 0.02 | 0.02 | 0.02 | 0.02 | 0.02 |
| Dye 1 | 0.04 | 0.04 | 0.04 | 0.04 | 0.04 |
| Pigm 1 | 0.01 | 0.01 | 0.01 |  |  |
| Pigm 2 |  |  |  | 0.01 | 0.01 |
| visual inspection | + | + | + | + | + |

|  | IE 11 | IE 12 | IE 13 | IE 14 | IE 15 |
|---|---|---|---|---|---|
| Comp 1 |  |  | 39.40 | 39.40 | 39.39 |
| Comp 2 |  | 9.60 |  |  |  |
| Comp 3 |  |  |  |  |  |
| Comp 4 |  |  |  |  |  |
| Comp 5 |  |  | 59.71 | 59.71 | 59.69 |
| Comp 6 |  | 83.60 |  |  |  |
| Comp 7 |  |  |  |  |  |
| Comp 8 | 63.62 |  |  |  |  |
| Comp 9 | 27.26 |  |  |  |  |
| Add 1 |  | 5.08 |  |  |  |
| Add 2 |  |  |  |  |  |
| Add 3 | 7.40 |  |  |  |  |
| Ini 1 | 1.60 | 1.60 |  |  |  |
| Ini 2 |  |  | 0.80 | 0.80 | 0.80 |
| Dye 2 | 0.04 | 0.04 | 0.02 | 0.02 | 0.04 |
| Dye 1 | 0.08 | 0.08 | 0.04 | 0.04 | 0.08 |

-continued

| | | | | | |
|---|---|---|---|---|---|
| Pigm 1 | | | 0.03 | | |
| Pigm 2 | | | | 0.03 | |
| visual inspection | ++ | ++ | + | + | ++ |

COMPARATIVE EXAMPLE (CE)

| | CE 1 | CE 2 | CE 3 | CE 4 | CE 5 |
|---|---|---|---|---|---|
| Comp 1 | | | | | |
| Comp 2 | | | | | |
| Comp 3 | | | | | |
| Comp 4 | | | | | |
| Comp 5 | | | | | |
| Comp 6 | 83.59 | 83.59 | 83.59 | | |
| Comp 7 | 12.49 | 12.49 | 12.49 | | |
| Comp 8 | | | | | |
| Comp 9 | | | | | |
| Add 1 | 2.32 | 2.28 | 2.24 | | |
| Add 2 | | | | | |
| Add 3 | | | | | |
| Ini 1 | 1.60 | 1.60 | 1.60 | | |
| Ini 2 | | | | | |
| Dye 2 | | 0.04 | | | |
| Dye 1 | | | 0.08 | | |
| Pigm 1 | | | | | |
| Pigm 2 | | | | | |
| Prod 1 | | | | 100.00 | |
| Prod 2 | | | | | 100.00 |
| visual inspection | -- (FIG. 4) | - (FIG. 2) | - (FIG. 3) | - | - |

Characterization of the Curable Compositions

| | Specimen layer thickness | IE1 | CE 2 | CE 3 | CE 1 |
|---|---|---|---|---|---|
| Colour impression | 2 mm | black | blue | red | colourless |
| Chroma (C*) in Transmission mode | 5 mm | 6.5 | 46.8 | 104.1 | 32.5 |
| Hue (h°) in Transmission mode | 5 mm | 14 | 306 | 46 | 112 |
| Transmission (% T) | 1 mm | 12.2 | 24.1 | 37.0 | 78.6 |

What is claimed is:

1. A coloured curable composition for use in an additive manufacturing process, the composition comprising:
    a curable resin composition comprising radiation curable components,
    a photo initiator,
    a dye composition comprising a dye D1 and a dye D2,
        dye D1 having a light absorption maximum within a wave length range from 400 to 530 nm,
        dye D2 showing a light absorption maximum within a wave length range from 540 to 650 nm.

2. The coloured curable composition of claim 1, wherein either dye D1 or dye D2 or dye D1 and dye D2 have an additional light absorption within a wave length range from 300 to 400 nm with an intensity being at least 20% compared to the intensity of the light absorption of the respective dye(s) within a wave length range from 400 to 650 nm.

3. The curable composition of claim 1, being characterized by one or more of the following features:
    viscosity: less than 200 mPa*s at 23° C.;
    light absorption in the range from 400 to 650 nm: more than 90% for a path length of 5 mm;
    light transmission: less than 25% for a path length of 1 mm;
    colour impression: deeply coloured for a path length of 1 mm or more;
    pH value if the curable composition is brought in contact with wet pH sensitive paper: 6-8;
    optionally combustible within a temperature range from 600 to 900° C. without residues.

4. The curable composition of claim 1, the photo initiator being characterized by one or more of the following features:
    showing a light absorption band within a wave length range from 300 to 450 nm;
    solubility in curable composition: at least 2 g/l at 23° C.

5. The curable composition of claim 1, dye D1 being characterized by one or more of the following features:
    molecular weight: from 50 to 1,000 g/mol;
    solubility in the curable composition: at least 0.1 g/l at 23° C.;
    comprising an anthraquinone moiety, azo moiety, naphthoquinolinedione moiety, isoquinoline moiety or xanthenone moiety.

6. The curable composition of claim 1, dye D2 being characterized by one or more of the following features:
    molecular weight: from 50 to 1,000 g/mol;
    light absorption within a wave length range from 300 to 400 nm with an intensity being at least 20% compared to the intensity of the light absorption within a wave length range from 540 to 650 nm;
    solubility in the curable composition: at least 0.05 g/l at 23° C.;
    comprising an anthraquinone moiety, azo moiety, phenoxazine moiety, or triphenylmethane moiety.

7. The curable composition of claim 1, the radiation curable component(s) comprising a backbone and reactive groups being attached to the backbone, the radiation curable component(s) being characterized by one or more of the following features (chemical):
    bearing one or more (meth)acrylate moieties as reactive groups;
    bearing aromatic, aliphatic, or aromatic-aliphatic moieties in the backbone;
    optionally bearing one or more urethane moieties in the backbone;
    optionally bearing one or more hydroxyl groups in the backbone.

8. The curable composition of claim 1, the ratio of dye D1 to dye D2 in the curable composition being from 0.1:1 to 3:1 with respect to weight.

9. The curable composition of claim 1 comprising one or more of the following component(s):
    high boiling additive(s), preferably having a boiling point above 100° C. in an amount from 1 to 20 wt. % with respect to the weight of the whole composition;
    stabilizer(s), preferably in an amount from 0.001 to 1 wt. % with respect to the weight of the whole composition.

10. The curable composition of claim 1, not comprising one or more of the following component(s):
    filler(s) in an amount of more than 1 wt. %;
    inorganic pigment(s) in an amount of more than 1 wt. %;
    component(s) comprising elements other than C, H, O, N, S, P, Hal in an amount of more than 1 wt. %;
    wt. % with respect to the weight of the whole composition.

11. The curable composition of claim 1, comprising:
    radiation curable component(s) from 50 to 98 wt. %,
    photo initiator from 0.5 to 10 wt. %,
    dye D1 from 0.01 to 1 wt. %, dye D2 from 0.01 to 1 wt. %,
high boiling additive from 0 to 20 wt. %,
wt. % with respect to the weight of the whole composition.

12. The curable composition of claim 1, comprising:
radiation curable components comprising a (meth)acrylate moiety and being present in an amount from 50 to 96 wt. %,
photo initiator comprising a phosphine oxide moiety and being present in an amount from 0.5 to 10 wt. %,
dye D1 comprising an anthraquinone moiety and being present in an amount from 0.01 to 1 wt. %,
dye D2 comprising an anthraquinone moiety and being present in an amount from 0.01 to 1 wt. %,
high boiling additive having a molecular weight from 100 to 500 g/mol and being present in an amount from 1 to 15 wt. %,
the curable composition not comprising
filler(s) in an amount of more than 1 wt. %,
inorganic pigment(s) in an amount of more than 1 wt. %,
component(s) comprising elements other than C, H, O, N, S, P, Hal in an amount of more than 1 wt. %,
wt. % with respect to the weight of the whole composition.

13. A process of producing a 3-dim article, the process comprising the step of processing the curable composition of claim 1, by an additive manufacturing technique.

14. A 3-dim composite article obtained or obtainable of claim 1, the article being characterized by one or more of the following features:

light transmission: less than 20% for a path length of 1 mm;
colour impression: black at a layer thickness of 2 mm or more;
hue h°: below 30 determined for a path length of 5 mm in transmission mode according to the CIELCh colour system;
chroma $C^*$: less than 20 determined for a path length of 5 mm in transmission mode according to the CIELCh colour system;
combustible within a temperature range of 800 to 950° C. without residues.

15. A process of producing a 3-dim cast article, the process comprising:
processing the curable composition of claim 1, in an additive manufacturing process to obtain a 3-dim composite article,
embedding the 3-dim composite article in an investment material,
replacing the material of the 3-dim composite article by a casting material to obtain a 3-dim cast article embedded in the investment material,
removing the investment material from the 3-dim cast article.

16. The composition of claim 1, wherein dye D1 is present in an amount from 0.04 to 0.1 wt. % and dye D2 is present in an amount from 0.02 to 0.1 wt. %, each wt. % with respect to the weight of the whole composition.

* * * * *